G. WESTINGHOUSE.
COUPLING.
APPLICATION FILED NOV. 16, 1911.
1,208,252. Patented Dec. 12, 1916.
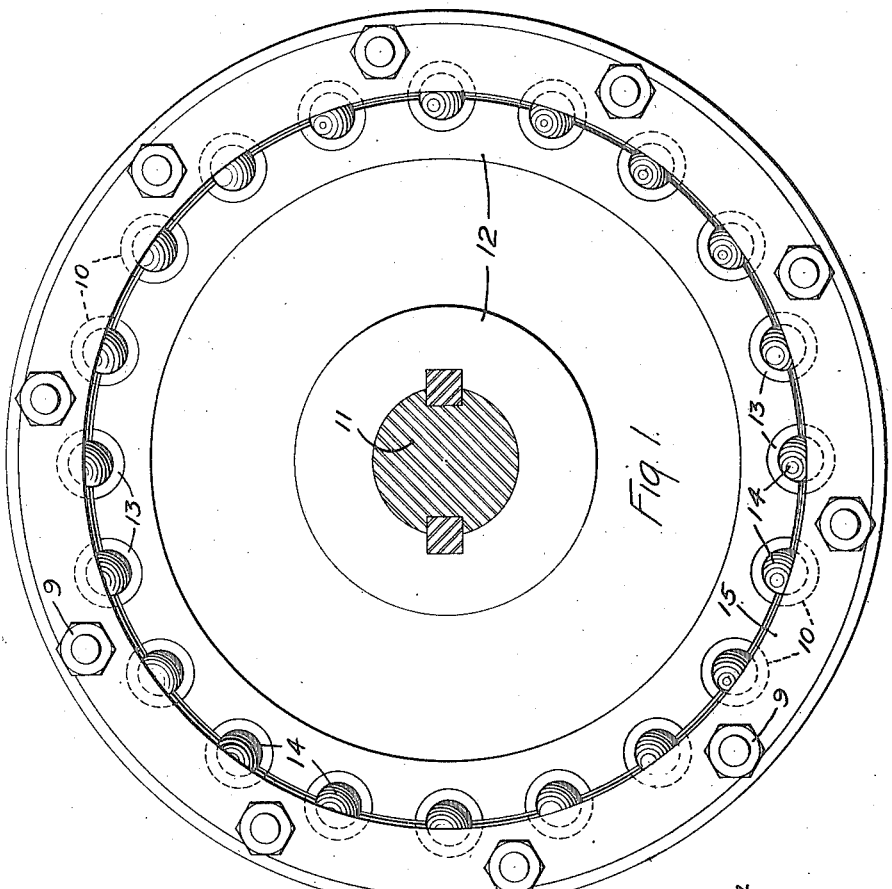
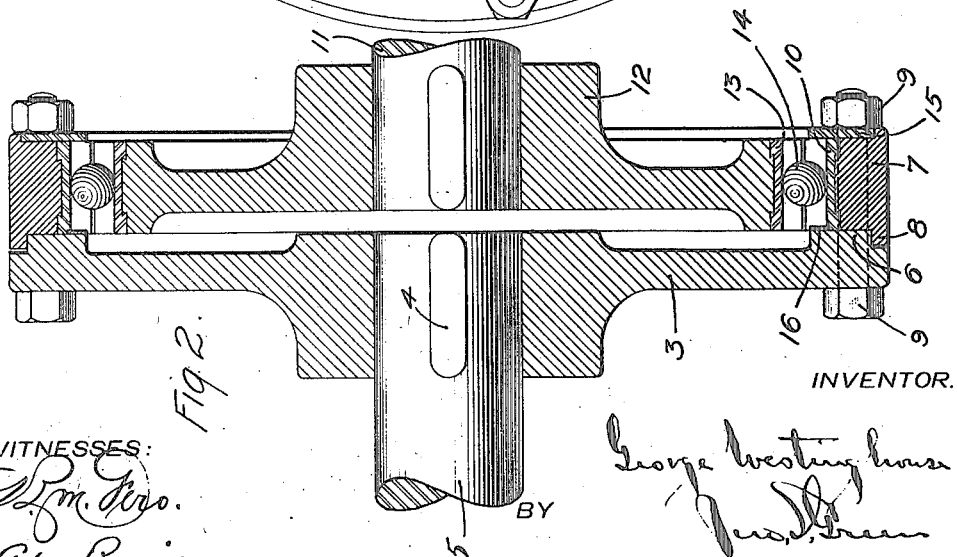
WITNESSES:
INVENTOR.
George Westinghouse
BY
HIS ATTORNEY IN FACT.

UNITED STATES PATENT OFFICE.

GEORGE WESTINGHOUSE, OF PITTSBURGH, PENNSYLVANIA, ASSIGNOR TO THE WESTINGHOUSE GEAR AND DYNAMOMETER COMPANY, A CORPORATION OF PENNSYLVANIA.

COUPLING.

1,208,252.  Specification of Letters Patent.  Patented Dec. 12, 1916.

Application filed November 16, 1911. Serial No. 660,659.

*To all whom it may concern:*

Be it known that I, GEORGE WESTINGHOUSE, a citizen of the United States, and a resident of Pittsburgh, in the county of Allegheny and State of Pennsylvania, have made a new and useful Invention in Couplings, of which the following is a specification.

This invention relates to mechanical coupling devices and more particularly to devices for coupling together the alined shafts of two rotary elements between which it is advisable to allow for relative longitudinal play.

An object of this invention is to produce a relatively cheap and simple device for so coupling together the alined shafts of two rotary elements that they may have free relative longitudinal play during rotation under load as well as when at rest. This, as well as other objects which will readily appear to those skilled in this art, I attain by means of the coupling device described in the specification and illustrated in the drawings accompanying the same and in the several views of which similar elements are denoted by like characters.

In the drawings: Figure 1 is an end elevation of a coupling device embodying this invention while Fig. 2 is a sectional elevation of the same showing the device, coupling together the alined shafts of two rotary elements.

The device consists of a disk member 3 keyed at 4 to shaft 5 which may be the shaft of a turbine, engine, electric motor, or the rotating shaft of any other device. The disk 3 is provided with a centering shoulder 6, and a ring member 7 provided with a coöperating centering shoulder 8 is bolted as at 9 to disk 3.

The ring 7 is provided with a plurality of semi-cylindrical slots which are milled across its inner periphery. Into each of these slots a hardened bushing 10 is preferably dove-tailed as shown in Fig. 2. These bushings, it will be seen, which are semi-cylindrical, may be assembled in the disk by sliding them around into the slots. The dovetailed portions of the walls of the slots or grooves prevent the bushings from moving laterally of the ring.

Shaft 11, which may be the shaft of the pinion of a reduction gear device, or the shaft of a motor or blower, or the like, and which is in alinement with shaft 5, carries a disk member 12 in line with ring member 7 and the outer periphery of this member is provided with slots or grooves corresponding in number and size to the grooves in ring 7. These grooves are provided with hardened bushings 13 similar to bushings 10 and within the cylindrical chambers thus formed by the coöperating bushings hardened balls 14 are placed, one within each chamber. These balls 14 are retained in the chambers by means of a retaining ring 15 which is secured to ring 10 by means of the same bolts 9 which fasten ring 10 to disk member 3. Between the inner edge of ring member 7 and the adjacent face of disk member 3 opposite the bushings 10 a hardened metallic ring 16 is secured in place.

In accordance with the provisions of the patent statutes, I have described the principle of operation of my invention together with the device which I now consider to represent the best embodiment thereof, but I desire to have it understood that the device shown is only illustrative and that the invention can be carried out in other ways.

Having thus described my invention, what I claim is:

1. In combination with two alined rotary shaft members, one of said shaft members being provided with a plurality of longitudinally extending open ended grooves formed in a peripheral face thereof, a telescoping member carried by the other shaft member and having similar grooves formed in an inner peripheral face thereof, semi-cylindrical bushings located in said grooves, a ball located within each pair of oppositely disposed bushings and forming a driving connection between the shaft members, and a retainer carried by said telescoping member for said balls.

2. In combination with two alined rotary shafts, a disk member carried by one of said shafts, a ring secured to said disk member and provided with laterally-extending semi-cylindrical grooves in its inner periphery, a disk member carried by the other shaft and provided with similar grooves coöperating with the grooves in said ring member, bushings secured in said grooves, balls located in said bushings and a retainer carried by said ring member for said balls.

3. In combination with two alined rotary shafts, a disk member carried by one of said shafts and provided in its outer peripheral face with open ended transversely extending semi-cylindrical grooves, a disk member carried by the other shaft and having a portion overhanging said first mentioned disk member and provided with correspondingly located similar grooves open at one end, a semi-cylindrical bush located in each groove, a metal spherical member located between each pair of oppositely disposed bushes and a retainer carried by one of said disk members for said balls.

In testimony whereof, I have hereunto subscribed my name this 10th day of November, 1911.

GEO. WESTINGHOUSE.

Witnesses:
C. W. McGHEE,
ADA ROMIG.